MAGNETIC TRANSFLUXOR MATRIX INFORMATION STORAGE DEVICE

Original Filed July 2, 1963

INVENTOR.
MICHELE CANEPA
BY
Kenyon & Kenyon
ATTORNEYS

INVENTOR.
MICHELE CANEPA
BY Kenyon & Kenyon
ATTORNEYS

United States Patent Office 3,434,129
Patented Mar. 18, 1969

3,434,129

MAGNETIC TRANSFLUXOR MATRIX INFORMATION STORAGE DEVICE

Michele Canepa, South Norwalk, Conn., assignor, by mesne assignments, to Olivetti-General Electric S.p.A., Milan, Italy, an Italian company
Continuation of application Ser. No. 292,358, July 2, 1963. This application Feb. 14, 1968, Ser. No. 705,566
Claims priority, application Italy, July 2, 1962, 13,362/62
U.S. Cl. 340—174 11 Claims
Int. Cl. G11b 5/30

ABSTRACT OF THE DISCLOSURE

There is disclosed a storage device employing a matrix of transfluxors, each transfluxor storing a bit. The value of the bit stored is determined by the direction of rotation of the flux around the small aperture of the transfluxor. A plurality of write windings are threaded through the large apertures of the transfluxors. Each one of the write windings is threaded in a first sense through a portion of the transfluxors. The portion of the transfluxors in which any one write winding is threaded in the first sense is unique to that write winding. Each write winding is thus coupled in the first sense to a different set of transfluxors although there is overlapping between the sets. In addition, there are pulse sources attached to the write windings so that proper selection of write winding and sequencing of pulses, taking into consideration the direction of the pulses, provides the ability to store information bits having a given value in a selected portion of the transfluxors.

The present invention relates to a magnetic information storage device for storing a plurality of bit combinations, which may represent for example control instructions for an electronic computer.

According to United States Patent No. 3,223,982 issued Dec. 14, 1965 to Giorgio Sacerdoti et al. an electronic computer may be controlled by means of a set of microprograms, each one comprising a plurality of microinstructions stored in a suitable internal storage of the computer.

A known device for storing microprograms comprises a magnetic core matrix wherein all the bit combinations of the entire set of microprograms are permanently stored. Therefore, such a storage device is wasteful of space and expensive, because it comprises a great number of magnetic cores.

Such a disadvantage may be obviated by another known device for storing a number $n$ of bit combinations, wherein each combination represents a microprogram comprising a number $m$ of microinstructions, each microinstruction comprising $p$ bits. Said storage device is made of a matrix of toroidal magnetic cores, wherein for each bit combination, that is for each microprogram, a microprogram selection wire is provided, said wire being threaded through said cores in a way peculiar to said microprogram.

By energizing a microprogram selection wire the corresponding combination of bits is caused to be written into the memory. Thus any microinstruction of a microprogram may be made available by first energizing the selection wire for said microprogram and then reading out the contents of the cores containing said microinstruction. Therefore, a storage comprising only $m.p$ magnetic cores and provided with $n$ microprogram selection wires may be arranged to store $m.n.p.$ bits.

However, as the toroidal cores must have a small diameter in order to obtain a high operation speed, only a limited number $n$ of microprogram selection wires may be threaded therethrough.

Finally, a storage for microprograms may comprise a transfluxor matrix of the type described in the article of T. A. Rajchman and A. W. Lo published in the Proceedings of the Western Joint Computer Conference, Feb. 7–9, 1956, pp. 109 to 118. Each transfluxor, which is provided with a large aperture and a small aperture, is used as a binary storage element, the bits "0" and "1" being represented by the "blocked" and "set" states, respectively, of the transfluxor. Modification of the contents of such a storage device in order to select a microprogram may be achieved by energizing a set of wires threaded through the large apertures of the transfluxors. Therefore, a large number of microprogram selection wires may be used for each transfluxor. However, a disadvantage of such a storage device consists in that the microprogram modification is very slow, as the large aperture of the transfluxors is involved.

It is an object of the present invention to provide an improved magnetic information storage device for storing a plurality of bit combinations.

It is a more particular object of the present invention to provide a magnetic core storage device for storing a great number of bit combinations with a small number of cores and with a high operation speed.

A further object of the present invention is to provide a novel use of a transfluxor as a binary storage device.

A further object of the present invention is to provide a new method for writing information into a magnetic core storage device.

These and other objects and features of the invention will become apparent from the following description of a preferred embodiment thereof, taken in conjunction with the accompanying drawings, in which.

A device for storing a plurality of bit combinations according to the present invention comprises a transfluxor matrix wherein each transfluxor is used to store a bit.

Figure 1:
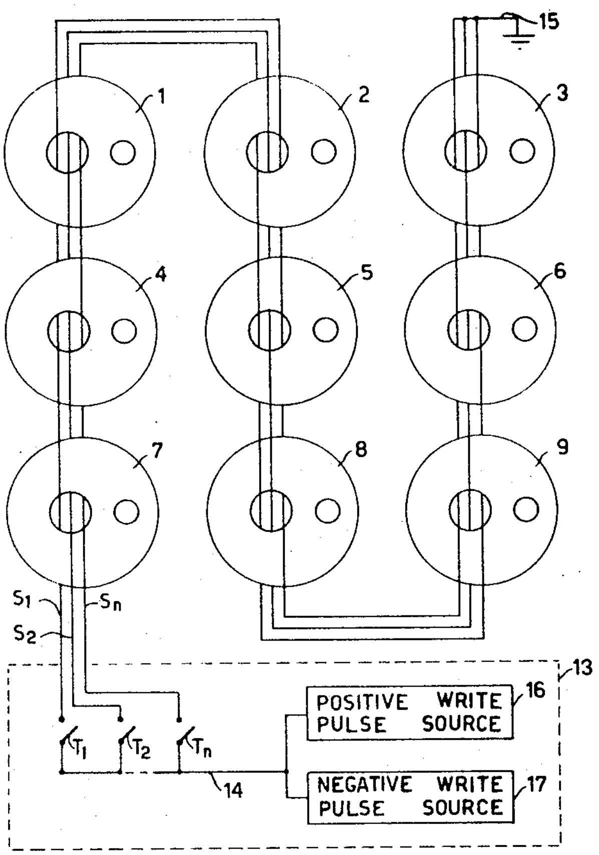
FIG. 1 shows a schematic diagram of a first embodiment of a magnetic information storage device according to the invention.
Figure 2:
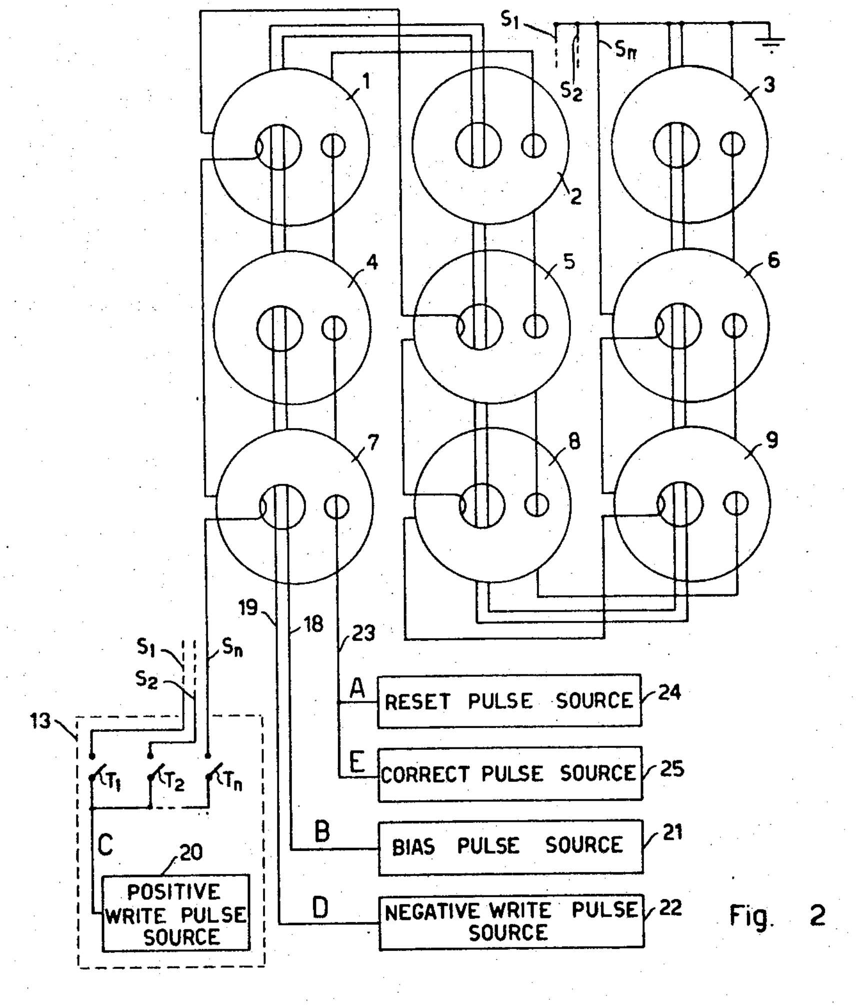
FIG. 2 shows a schematic diagram of a second embodiment of the storage device according to the invention.

In both the embodiments shown in FIGS. 1 and 2, a matrix comprising only nine transfluxors 1 to 9 arranged in three rows and three columns is considered for simplicity.

Each transfluxor (FIG. 3*a*) is made of a core 10 of magnetic material having a substantially rectangular hysteresis loop and provided with a large aperture 11 and a small aperture 12, which defines three legs I, II and III. In the storage device according to the invention, the closed magnetic flux path comprising the magnetic material surrounding the small aperture, which is dashed in FIG. 3*a*, which includes the legs II and III, and which will be hereinafter referred to as first flux path, acts as a binary storage element, as if it were a conventional toroidal core, the value of the bit stored therein being "1" or "0" depending upon whether the remanent magnetic flux flows therein in the clockwise or counterclockwise direction.

Therefore, said storage elements surrounding the small aperture of the transfluxors 1 to 9 form a conventional magnetic core matrix comprising three rows and three columns of cores and provided with the usual read-out and write devices. To this end, threaded through the small aperture of each transfluxor there are, for example, a line selection wire, a column selection wire, a read-out wire and an inhibition wire, according to the conventional technique used for the toroidal magnetic core matrix memories. As the arrangement and use of said windings is well known in the art, for example from the Patent 2,691,154 issued Oct. 5, 1954 to J. A. Rajchman, they are not shown in the drawings. However, any known arrangement for writing and reading-out information stored in the conventional toroidal magnetic core matrix memories may be applied to the storage device comprising the nine memory elements of the transfluxors 1 to 9 of the present invention.

In addition to said read-out and write windings and independently therefrom, and in order to select in the storage device the different bit combinations, that is the different microprograms, a microprogram write wire $S_1$, $S_2 \ldots S_n$ is provided for each combination, said microprogram write wire being threaded through predetermined transfluxors in a way peculiar to said microprogram. More particularly, each write wire is threaded through the large aperture of the transfluxors in order to write in the corresponding storage elements and may be selected and energized by means of a selecting and driving device 13, adapted to feed suitable write current pulses into any selected wire.

In the first embodiment according to FIG. 1, each one of *n* microprogram wires $S_1$ to $S_n$ is threaded through all the transfluxors of the matrix and for each transfluxor the threading sense depends upon the value "0" or "1" of the bit to be written therein according to the combination corresponding to said wire.

For example, the wire $S_n$ is threaded in one sense through the transfluxors 1, 5, 6, 7, 8 and 9 and in the opposite sense through the transfluxors 2, 3 and 4. It will thus be apparent that the energization of the wire $S_n$ causes a flux direction representing the bit combination 1, 0, 0, 0, 1, 1, 1, 1, 1 to be written into the storage elements of the transfluxors 1 to 9, respectively.

Assuming that each microprogram instruction is composed of three bits, in the matrix of FIG. 1 it will be possible to store, for example, an instruction in each line. By energizing said wire $S_n$ the microprogram comprising the three instructions 100, 011, 111 will be made available for reading out. Thus the available instructions will be $3 \times n$, where 3 is the number of the matrix lines and *n* the number of microprogram wires.

Therefore, in the above example each microinstruction will be jointly identified by a microprogram wire and by the address of a line.

Obviously, in practice the number and the arrangement of the transfluxors of the storage device, as well as the arrangement of the microinstruction in the storage device, may be chosen at will depending upon the structure of the above mentioned reading and writing devices associated with the small aperture of the transfluxors.

The selecting device 13 comprises for each one of the microprogram wires $S_1$, $S_2 \ldots S_n$ a selection switch $T_1$, $T_2 \ldots T_n$, respectively, connected between a terminal of the corresponding wire and a common terminal 14. The other terminal of the wire is connected to a point 15 having a constant potential. The terminal 14 is connected to a positive write pulse source 16 and to a negative write pulse source 17.

The operation of the storage device according to FIG. 1 will now be briefly described.

Assuming the microinstruction corresponding to the wire $S_n$ and to the first line is to be extracted from the storage device, then first the selection switch $T_n$ is closed to connect only the wire $S_n$ to the sources 16 and 17, whereby the *n*th microprogram is selected.

Subsequently, the source 16 is energized, whereby a first positive write current pulse having a large amplitude is fed to the wire $S_n$. Said current pulse causes the legs II and III of the transfluxors 1, 5, 6, 7, 8 and 9 to be magnetically saturated in a same direction, as shown by the arrows in FIG. 3*c*, and the legs II and III of the transfluxors 2, 3 and 4 to be saturated in the opposite direction, as shown by the arrows in FIG. 3*e*, due to the opposite threading sense of the microprogram wire.

Therefore, in consequence of said first write pulse all the transfluxors are "blocked" according to the language used in the above mentioned article.

Subsequently, the pulse source 16 is deenergized, while the pulse source 17 is energized to feed the wire $S_n$ with a second write current pulse.

Figure 3:
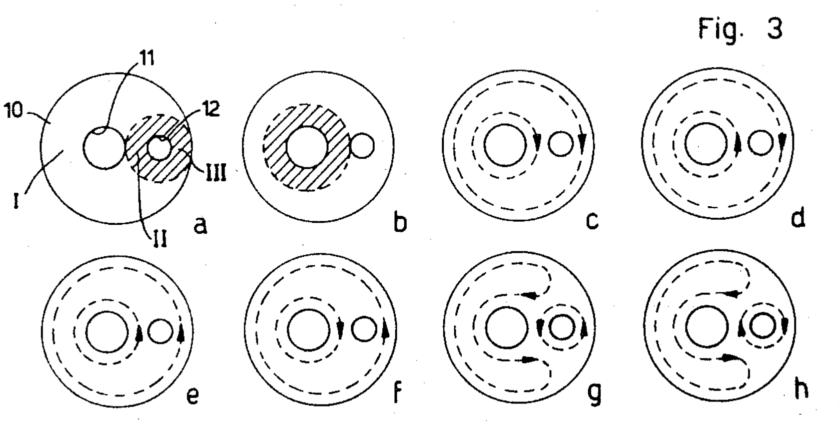
FIG. 3 are symbolic drawings showing the magnetic flux configuration in the transfluxors during the different phases of the operation of the storage devices according to FIGS. 1 and 2.

Said second write pulse has an amplitude smaller than that of the first write pulse and an opposite polarity, namely negative: the amplitude is regulated to such a value as to reverse the magnetic saturation state of that part of each transfluxor which is dashed in FIG. 3*b* and which will be referred to as the second flux path, whereby the direction of the flux in the leg II of each transfluxor is reversed, while the state of the closed flux path surrounding both apertures and including legs I and III, and referred to hereinafter as the third flux path, remains unchanged, so as to "set" the transfluxors, according to the language used in the cited article. Therefore, after the second write pulse the flux direction in the legs II and III of the transfluxors 2, 3 and 4 is that represented in FIG. 3*f* and for the transfluxors 1, 5, 6, 7, 8 and 9 is that represented in FIG. 3*d*. Consequently, under the joint effect of the first and second write pulses the magnetic flux in the legs II and III of each transfluxor assumes oppositive directions, so that in the first flux path around the small aperture of each transfluxor a resultant circulating flux is obtained, whose direction depends upon the sense according to which the wire $S_n$ is threaded therethrough so as to represent the informations "1" or "0" respectively. Consequently, it is apparent that the bit combination 1, 0, 0, 0, 1, 1, 1, 1, 1, remains stored in the storage elements of the transfluxors 1, 2, 3, 4, 5, 6, 7, 8, 9, respectively. Thereafter it will be possible, by means of the above mentioned reading devices associated with the small apertures, to extract the microinstruction "100" contained in the first line of the matrix and use it in a known manner in order to control the computing machine. The same microinstruction, after having been used and, if necessary, modified according to one of the processes known in the technique of the control of the electronic computers, will be rewritten into said line by means of the above mentioned writing devices associated with the small apertures. In the same way any other microinstruction may be read-out from the storage device.

In the second embodiment of the invention according to FIG. 2, each one of the *n* microprogram write wires $S_1$ to $S_n$ is threaded only through those transfluxors of the matrix for which the bit to be written according to the corresponding combination has a predetermined value, for example the value "1." Furthermore a bias wire 18 common to all of the transfluxors and a set wire 19 also common to all the transfluxors are threaded through the large aperture of each transfluxor. The microprogram wires $S_1$ to $S_n$ are fed, through corresponding selection switches $T_1$ to $T_n$, by positive write pulse source 20, while the wires 18 and 19 are fed by a bias pulse source 21 and by a negative write pulse source 22, respectively.

Suitable read-out and write windings, not shown in the drawings, are threaded through the small apertures of each transfluxor, as previously explained. Moreover, a reset wire 23 common to all the transfluxors is threaded through the small aperture of each transfluxor and is connected to a reset pulse source 24 and to a correct pulse source 25.

The operation of the storage device according to FIG. 2 will now be briefly described.

In order to select the *n*th microprogram, the selection switch $T_n$ is closed, so as to connect only the wire $S_n$ to the pulse source 20. This selection step is taken without energizing the positive write pulse source 20.

Figure 4:
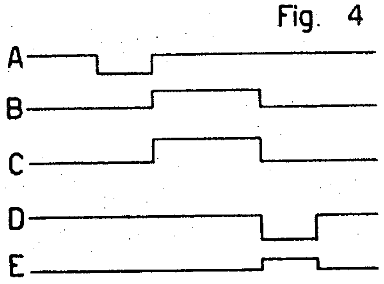
FIGS. 4 and 5 show the time diagram of some pulses present in the storage device of FIG. 2.

Subsequently, the reset pulse source 24 is energized to feed the wire 23 with a pulse A (FIG. 4) adapted to drive all the storage elements to the "0" state, that is to establish in the first flux path around the small aperture of each transfluxor a flux circulating in the counterclockwise direction, as shown in FIG. 3*g*.

Thereafter, the pulse sources 20 and 21 are concurrently energized to feed the wire $S_n$ and 18, respectively, with a pulse C and B, respectively. Each one of said pulses C and B has an amplitude equal, for instance, to half the amplitude necessary to "block" a transfluxor, that is to set it in the flux condition shown in FIG. 3*c*. Therefore, the transfluxors having the selected microprogram wire $S_n$ threaded therethrough are blocked, because the effects of the pulses B and C add to each other, while the state of the other transfluxors remains unchanged and equal to that shown in FIG. 3*g*, whereby their storage elements remain in the "0" state.

Thereafter the pulse source 22 is energized to feed the wire 19 with a pulse D. The polarity and the amplitude of the pulse D are such as to switch the magnetic flux of the second flux path (dashed zone in FIG. 3*b*) of each transfluxor which was in the "blocked" state of FIG. 3*c* to the counterclockwise direction, whereby said transfluxor is switched to the "set" state of FIG. 3*d*. On the other hand the pulse D does not substantially modify the state of the transfluxors not having the selected wire $S_n$ threaded therethrough, in that in the dashed zone of FIG. 3*b* of said transfluxors the magnetic material before the pulse D is already saturated in the counterclockwise direction, as shown in FIG. 3*g*. During the puse D the correction pulse source 25 is energized as well to feed the wire 23 with a correct pulse E having a polarity opposite to that of the reset pulse and therefore tending to set the storage elements to the state "1" but having an amplitude insufficient by itself to cause said elements to be effectively switched to said state. Therefore, the elements which are in the state "0" remain in this state (FIG. 3*g*), while on the contrary in the elements which are in the state "1" shown in FIG. 3*d*, the state of the flux is switched to that shown in FIG. 3*h*.

Figure 5:
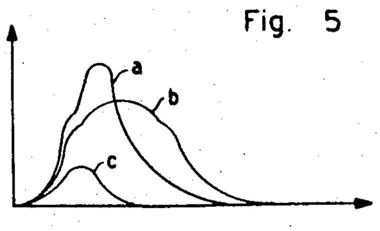

As a consequence, the wave-form of the read-out signal obtained when thereafter reading out the bit "1" will be improved. As a matter of fact, when reading out, an operation, which generally is made by applying to the storage element of each transfluxor an interrogation magnetomotive force pulse suitable to set the first flux path (dashed zone of FIG. 3*a*) to the "0" state by means of the windings threaded through the small aperture thereof and not shown in the drawings, exit signals *a*, *b*, *c* (see FIG. 5) are obtained on the read-out wire threaded through said small aperture and not shown in the drawings depending upon whether an element being in the state "1" of FIG. 3*h* in the state "1" of FIG. 3*d*, or in the state "0" of FIG. 3*g*, respectively is interrogated. It is apparent that the signal *a* may be more easily distinguished from the signal *c* than the signal *b*.

Summarizing, under the joint effect of the pulses B, C, D and E the storage elements of the transfluxors having the selected wire $S_n$ threaded therethrough are set in the state "1" of FIG. 3*h* while the storage elements of the other transfluxors, which are affected only by the pulses B, D and E, remain in the state "0" of FIG. 3*g*. Thus the selecting and writing phase of the microprogram is accomplished, and the several microinstructions included in said microprogram may be read-out, as previously explained.

The correct pulses A and E may be advantageously used in the memory of FIG. 1, as well, the correction being then effected by applying to a wire threaded through the small aperture of all the transfluxors a pair of correct pulses having opposite polarity and different timing.

It is to be noted that in the storage device according to FIG. 2, the use of the bias pulses B is not essential.

However, it allows the amplitude of the pulses C fed to the *n* microprogram wires $S_1$ to $S_n$ to be advantageously reduced at expenses of the addition of only one bias wire.

More generally, it is apparent that in the storage device according to the invention each microprogram may be selected and written in the storage elements of the transfluxors by selecting and energizing, instead of only one wire S, a suitable set of wires threaded through the large apertures of the transfluxors and cooperating according to any one of the "coincidence" methods well known in the technique of the usual toroidal magnetic core memories.

Moreover, it is to be noted that, as previously menioned, while in the conventional use of the transfluxor the bits "0" and "1" are represented by means of the "blocked" and "set" states, respectively, in the storage device according to the invention the same bits are represented by the direction of the remnant magnetic flux in the flux path around the small apeture, each transfluxor, when storing an information, being never "blocked." On the other hand it is known from the above article that when a transfluxor is "set," that is when it is in the state shown either in FIG. 3*d* or in FIG. 3*f* it is possible to modify the flux around the small aperture by means of current pulses fed through line and column wires threaded therethrough. Therefore, the contents of the storage device according to the invention may be modified by using wires threaded through the small aperture, and consequently it may be modified at high operation speed.

It is also remarkable that in the storage device according to the invention, while the storage elements surrounding the small aperture of the transfluxors constitute, as above said, a memory like the usual toroidal magnetic core memories, the circuits associated with the large apertures of the transfluxors are a means for writing information in said storage elements without using wires threaded through said small apertures.

It is apparent that the storage device according to the invention may be used for storing signal combinations for any purpose different from those hitherto shown, and, for instance for storing telegraphic signal combinations.

It is intended that many changes, addition of parts and improvements may be made to the above described storage device without departing from the scope thereof.

What is claimed is:

1. A storage device comprising:

a set of transfluxors, each one having a large and a small aperture, each one of said transfluxors having a first flux path around its small aperture, a second flux path around its large aperture and a third flux path around both of said apertures, said first flux path having segments thereof in common with segments of said second and said third flux paths, a first subset of transfluxors, each one of the transfluxors in said first subset having a clockwise remanent magnetic flux flow around its small aperture to store an information bit having a first value in its first flux path, a second subset of said transfluxors, each one of the transfluxors in said second subset having a counterclockwise remanent magnetic flux flow around its small aperture to store an information bit having a second value in its first flux path, the value of the bits stored in said storage device being determined by the direction of remanent flux flow in the first flux path, and a plurality of write windings coupled to said large apertures of a portion of said transfluxors for controlling the direction of the remanent flux flow in said second and third flux paths of the transfluxors in said portion, whereby the appropriate sequential and directional pulsing of said write windings will store an information bit in the first flux paths of the transfluxors in said portion.

2. The storage device of claim 1, wherein:

a first one of said write windings is coupled in a first sense to the large apertures of said transfluxors in said first subset for controlling the direction of the remanent magnetic flux flow in said second and third flux paths of said first subset of transfluxors.

3. The storage device of claim 2 wherein:

said first write winding is coupled in a second sense, opposite to said first sense, to the large apertures of said transfluxors in said second subset for controlling the direction of the remanent magnetic flux flow in said second and third flux paths of said second set of transfluxors, whereby the sequential and directional pulsing of said write winding to store an information bit having a first value in said first flux paths of said first subset of transfluxors will store an information bit having a second value in said first flux path of each of said transfluxors in said second subset.

4. The storage device of claim 3 further characterized by:

first means to pulse said first write winding with a first pulse having a magnitude sufficient to establish remanent magnetic flux having a clockwise flow in said second and said third flux paths of each of said transfluxors in said first subset and to establish remanent magnetic flux having a counterclockwise flow in said second and said third flux paths of each of said transfluxors in said second subset, and second means to pulse said first write winding with a second pulse having a polarity opposite to that of said first pulse, said second pulse having a magnitude sufficient to establish remanent magnetic flux flow, opposite in direction to that established by said first pulse, in said second flux path of each of said transfluxors without affecting the direction of remanent magnetic flux flow in said third flux path, thereby establishing a remanent magnetic flux flow in said first flux path of each of said transfluxors, the direction of said flux flow in said first flux path being clockwise around said small apertures of said transfluxors in said first subset and being counterclockwise around said small apertures of said transfluxors in said second subset.

5. The storage device of claim 2 further characterized by:

a second write winding coupled in a given sense to the small apertures of each of said transfluxors in said set of transfluxors for writing an information bit having a second value in said first flux path of each of said transfluxors in said set of transfluxors.

6. The storage device of claim 5 further characterized by:

first means to pulse said second write winding with a first pulse having a magnitude sufficient to establish remanent magnetic flux having a counterclockwise flow in said first flux path of each of said transfluxors in said set of transfluxors, second means to pulse said first write winding with a second pulse having a polarity and magnitude sufficient to establish remanent magnetic flux having a clockwise flow in said second and third flux paths of each of said transfluxors in said first subset, and third means to pulse each of the large apertures of said transfluxors in said first subset with a third pulse having a polarity opposite to that of said second pulse, said third pulse having a magnitude sufficient to establish remanent magnetic flux having a counterclockwise flow in said second flux path of each of said transfluxors in said first subset without affecting the direction of remanent magnetic flux flow in said third flux path, thereby establishing remanent magnetic flux having a clockwise flow in the first flux path of each of said transfluxors in said first subset.

7. The storage device of claim 6 wherein said third means includes:

a third write winding coupled in a given sense to each one of the large apertures of said transfluxors in said set of transfluxors, and pulse source means for pulsing said third write winding with said third pulse.

8. In a storage device employing a set of transfluxors, each transfluxor having a large aperture and a small aperture, a first flux path around said small aperture, a second flux path around said large aperture and a third flux path around both of said apertures, said first flux path having portions in common with said second and third flux paths, the improvements comprising:

a plurality of write windings, each one of said write windings being coupled in a first sense to the large apertures of a subset of said transfluxors, different ones of said write windings being coupled in said first sense to different subsets of said transfluxors, first means to pulse a selected one of said write windings with a first pulse to establish remanent magnetic flux having a first direction in the second and third flux paths of those ones of said transfluxors in the subset to which said selected one of said write windings is coupled in said first sense, and second means to pulse the large aperture of at least those transfluxors in the said subset associated with said selected one of said write windings with a second pulse having a polarity opposite to that of said first pulse, said second pulse having a magnitude sufficient to establish remanent magnetic flux flow having a second direction, opposite to said first direction, in said second flux path of said transfluxors in the said subset associated with said selected one of said write windings without affecting the direction of remanent magnetic flux flow in said third flux path, thereby establishing in said first flux path of each of said transfluxors in the said subset associated with the subset to which said selected one of said write windings is coupled in said first sense, a resulting remanent magnetic flux flow having a direction representing a first bit value.

9. The storage device improvement of claim 8 further characterized by:

each one of said write windings being coupled in a second sense to the large apertures of the ones of said transfluxors which are outside of the said subset to which the write winding is coupled in said first sense, whereby said first pulse will establish remanent magnetic flux flow having said second direction in the second and third flux paths of said transfluxors outside of said subset, and whereby said second pulse will establish remanent magnetic flux flow having said first direction in said second flux path of said transfluxors outside of said subset, thereby establishing in the first flux path of the transfluxors outside of said subset a resultant flux flow having a direction which represents a second bit value.

10. The storage device of claim 8 further characterized by:

a second write winding coupled in a given sense to the small apertures of each of said transfluxors in said set of transfluxors, and third means to pulse said second write winding with a third pulse having a magnitude and polarity such as to establish remanent magnetic flux flow in said first flux path having a direction which represents a second bit value.

11. The storage device of claim 10 wherein said second means includes:
a third write winding coupled in a given sense to the large apertures of each of said transfluxors in said set of transfluxors, and
pulse source means for pulsing said third write winding with said second pulse.

References Cited

UNITED STATES PATENTS 2,983,906 5/1961 Crane ---------------- 340—174

BERNARD KONICK, *Primary Examiner.*

RAYMOND F. CARDILLO, Jr., *Assistant Examiner.*